(12) United States Patent
Ota

(10) Patent No.: US 7,296,802 B2
(45) Date of Patent: Nov. 20, 2007

(54) BOOT FOR COVERING BALL JOINT

(75) Inventor: Katsuhisa Ota, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/988,843

(22) Filed: Nov. 16, 2004

(65) Prior Publication Data
US 2005/0121860 A1 Jun. 9, 2005

(30) Foreign Application Priority Data
Nov. 17, 2003 (JP) ............................ P2003-387098

(51) Int. Cl.
*F16J 3/00* (2006.01)
*F16J 15/52* (2006.01)
*F16L 51/02* (2006.01)
(52) U.S. Cl. ...................... 277/635; 277/634; 277/636; 403/50
(58) Field of Classification Search ........ 277/634–636; 464/175; 403/50, 51; 74/18–18.2
See application file for complete search history.

(56) References Cited

U.S. PATENT DOCUMENTS 5,051,105 A * 9/1991 Sugiura et al. ............. 464/175

5,419,741 A * 5/1995 Schwarzler ................. 464/175
6,306,046 B1 * 10/2001 Didszuhn ................... 464/175
6,386,551 B1 * 5/2002 Martin ....................... 277/634
6,550,350 B2 * 4/2003 Martin ....................... 74/18.2

FOREIGN PATENT DOCUMENTS

| EP | 0 327 347 | 2/1989 |
| JP | A-H01-169173 | 7/1989 |
| JP | A-H10-238629 | 9/1998 |
| JP | A-H11-82737 | 3/1999 |
| WO | WO 00/65254 | * 11/2000 |

* cited by examiner

*Primary Examiner*—Patricia Engle
*Assistant Examiner*—Gilbert Lee
(74) *Attorney, Agent, or Firm*—Posz Law Group, PLC

(57) ABSTRACT

A boot is made of a resin for covering a ball joint interposed between a larger diameter mating member and a small diameter mating member, including a large diameter attachment portion fixed to the large diameter mating member, a first bellows portion continuous to the large diameter attachment portion, a second bellows portion which is continuous to the first bellows portion and in which at least a bottom inner peripheral diameter thereof is not larger than that of the first bellows portion and a rigidity in a radial direction thereof is lower than that of the first bellows portion, a taper bellows portion continuous to the second bellows portion, and a small diameter attachment portion continuous to the taper bellows portion and fixed to the small diameter mating member.

9 Claims, 4 Drawing Sheets

PRIOR ART

BOOT FOR COVERING BALL JOINT

BACKGROUND OF THE INVENTION

1. Field of the Invention

The present invention relates to a boot attached to, for example, a steering apparatus of a rack pinion type steering or the like.

2. Related Art

A steering boot covers a ball joint between a steering gear box and a tie rod. That is, one end of the steering boot is fixedly attached to an end of a steering gear box. Further, the other end of the steering boot is fixedly attached to the tie rod. The steering boot is arranged to be proximate to an engine. Therefore, an environmental temperature at a vicinity of the steering boot is a comparatively high temperature. Therefore, air hermetically sealed inside of the steering boot is expanded.

FIG. 4 shows a side view in an axial direction of a steering boot. As shown by the drawing, when air at inside of the steering boot 100 is expanded, the steering boot 100 is expanded to deform. Further, the steering boot 100 meanders to wave in an S-like shape between an end of a steering gear box 102 and an end of a tie rod 103. When the steering boot 100 meanders, the steering boot 100 is brought into sliding contact with a ball joint (not illustrated) or a clamp included therein. Therefore, there is a concern that the steering boot 100 malfunctions. Further, the steering boot 100 is made of a resin. Therefore, once the steering boot 100 meanders to deform, even when the steering boot 100 is cooled, the steering boot 100 is difficult to recover to an original shape.

In this respect, JP-A-10-238629 introduces a steering boot restrained from meandering. According to the steering boot described in the reference, bottoms of three pieces of bellows counted from one thereof fixedly attached to an end of a steering gear box are recessed with peripheral grooves in a U-like shape. Therefore, a rigidity in a diameter direction of the bellows having the peripheral grooves is made to be higher than a rigidity in the diameter direction of bellows of the other portions. Therefore, the steering boot described in the reference is difficult to meander.

However, according to the steering boot described in the reference, in order to increase the rigidity, it is necessary to form the peripheral groove which is not directly related to a function inherent to the bellows. Therefore, according to the steering boot described in the reference, a number of steps of working a die is large and cost is high. Further, by providing the peripheral groove at the bottom portion of the bellows, a rigidity in a direction of elongating and contracting the bellows is reduced and there is a possibility that a portion thereof which meanders to deform is liable to interfere with the clamp fixedly attached to the end of the steering gear box.

In view of the above-described problem, it is an object of the invention to provide a boot in which a number of steps of working a die is small, cost is low and meandering can restrained.

(1) In order to resolve the above-described problem, a boot of the invention is characterized in a boot made of a resin for covering a ball joint interposed between a large diameter mating member and a small diameter mating member, the boot including a large diameter attachment portion fixed to the large diameter mating member, a first bellows portion continuous to the large diameter attachment portion, a second bellows portion which is continuous to the first bellows portion and in which at least a bottom inner diameter thereof is not larger than a bottom inner peripheral diameter of the first bellows portion and a rigidity in a radial direction thereof is lower than a rigidity in a radial direction of the first bellows portion, a taper bellows portion continuous to the second bellows portion, and a small diameter attachment portion continuous to the taper bellows portion and fixed to the small diameter mating member.

That is, the boot of the invention is arranged with the first bellows portion making the rigidity in a radial direction higher than that of the second bellows portion while maintaining an axial direction rigidity thereof to a degree equivalent to that of the second bellows portion. According to the boot of the invention, meandering can be restrained by comparatively simple means of changing the inner peripheral diameter of the bellows portion. Therefore, a number of steps of working a die is small and cost is low. Further, according to the boot of the invention, the first bellows portion is difficult to deform by increasing the rigidity in a radial direction while maintaining the axial direction rigidity and therefore, the first bellows portion is difficult to be brought into sliding contact with a clamp of the larger diameter attachment portion.

(2) Preferably, there may be constructed a constitution in which the bottom inner peripheral diameter of the first bellows portion is not larger than 1.3 times of the bottom inner peripheral diameter of the second bellows portion. More specifically, a multiplication factor of the bottom inner peripheral diameter of the first bellows portion from that of the second bellows portion is equal to or larger than 1.0 and less than 1.3. Here, the bottom inner peripheral diameter of the first bellows portion is set to the bottom inner peripheral diameter of the second bellows portion multiplied by the multiplication factor equal to or larger than 1.0 because when the multiplication factor is less than 1.0, a difference is difficult to be brought about between the rigidities of the first bellows portion and the second bellows portion. That is, because when both of the first bellows portion and the second bellows portion are provided with high rigidities, a function of being elongated and contracted and bent inherent to the bellows is deteriorated. Further, both of the first bellows portion and the second bellows portion are provided with low rigidities, the above-described meandering is liable to be brought about.

On the other hand, the inner peripheral diameter of the first bellows portion is set to the bottom inner peripheral diameter of the second bellows portion multiplied by the multiplication factor equal to or smaller than 1.3 because when the multiplication factor exceeds 1.3, the difference between the diameters is excessively increased and there is a concern that the first bellows portion does not achieve the function of being elongated and contracted and bent inherent to the bellows.

(3) Preferably, there may be constructed a constitution in which at least a pivotal center of the ball joint is contained on an inner peripheral side of the second bellows portion, and the bottom inner peripheral diameter of the second bellows portion is equal to or slightly larger than an outer peripheral diameter of the ball joint.

According to the constitution, the second bellows portion deformed further predominantly than the first bellows portion is brought into contact with the ball joint soon after starting to deform. The second bellows portion is not deformed further by being restricted by the ball joint.

In this way, according to the constitution, the first bellows portion can be restrained from being deformed by the high rigidity of its own and the second bellows portion can be restrained from being deformed by being brought into contact with the ball joint, respectively. Therefore, not only meandering of the first bellows portion but also meandering of the second bellows portion can be restrained.

(4) Preferably, there may be constructed a constitution in which the bottom inner peripheral diameter of the second bellows portion is the outer peripheral diameter of the ball joint multiplied by a multiplication factor equal to or larger than 1.0 and less than 1.25 in the above-described constitution of (3). Here, the bottom inner peripheral diameter of the second bellows portion is set to the outer peripheral diameter of the ball joint multiplied by the multiplication factor equal to or larger than 1.0 because when the multiplication factor is less than 1.0, the boot is difficult to be mounted to the outer peripheral side of the ball joint. Further, because pivotal movement of the ball joint is excessively restrained by interference with the second bellows portion.

On the other hand, the bottom inner peripheral diameter of the second bellows portion is set to the outer peripheral diameter of the ball joint multiplied by the multiplication factor equal to or less than 1.25 because when the multiplication factor exceeds 1.25, an amount of deforming the second bellows portion to be brought into contact with the ball joint is increased. That is, because meandering cannot sufficiently be restrained.

(5) Preferably, there may be constructed a constitution in which an end portion of the ball joint is contained in the taper bellows portion in the above-described constitution of (3). According to the constitution, the taper bellows portion is brought into contact with the end portion of the ball joint soon after starting to deform. The taper bellows portion is not deformed further by being restrained by the ball joint. According to the invention, not only meandering of the first bellows portion and the second bellows portion but also meandering of the taper bellows portion can be restrained.

According to the invention, there can be provided the boot in which a number of steps of working the die is small, the cost is low and meandering can be restrained by arranging the first bellows portion increasing the rigidity in a radial direction continuous to the large diameter attachment portion while maintaining the axial direction rigidity to a degree equivalent to that of the second bellows portion.

DETAILED DESCRIPTION OF THE PREFERRED EMBODIMENTS

An explanation will be given of a steering boot (hereinafter, abbreviated as "boot") according to an embodiment of a boot of the invention as follows.

Figure 1:
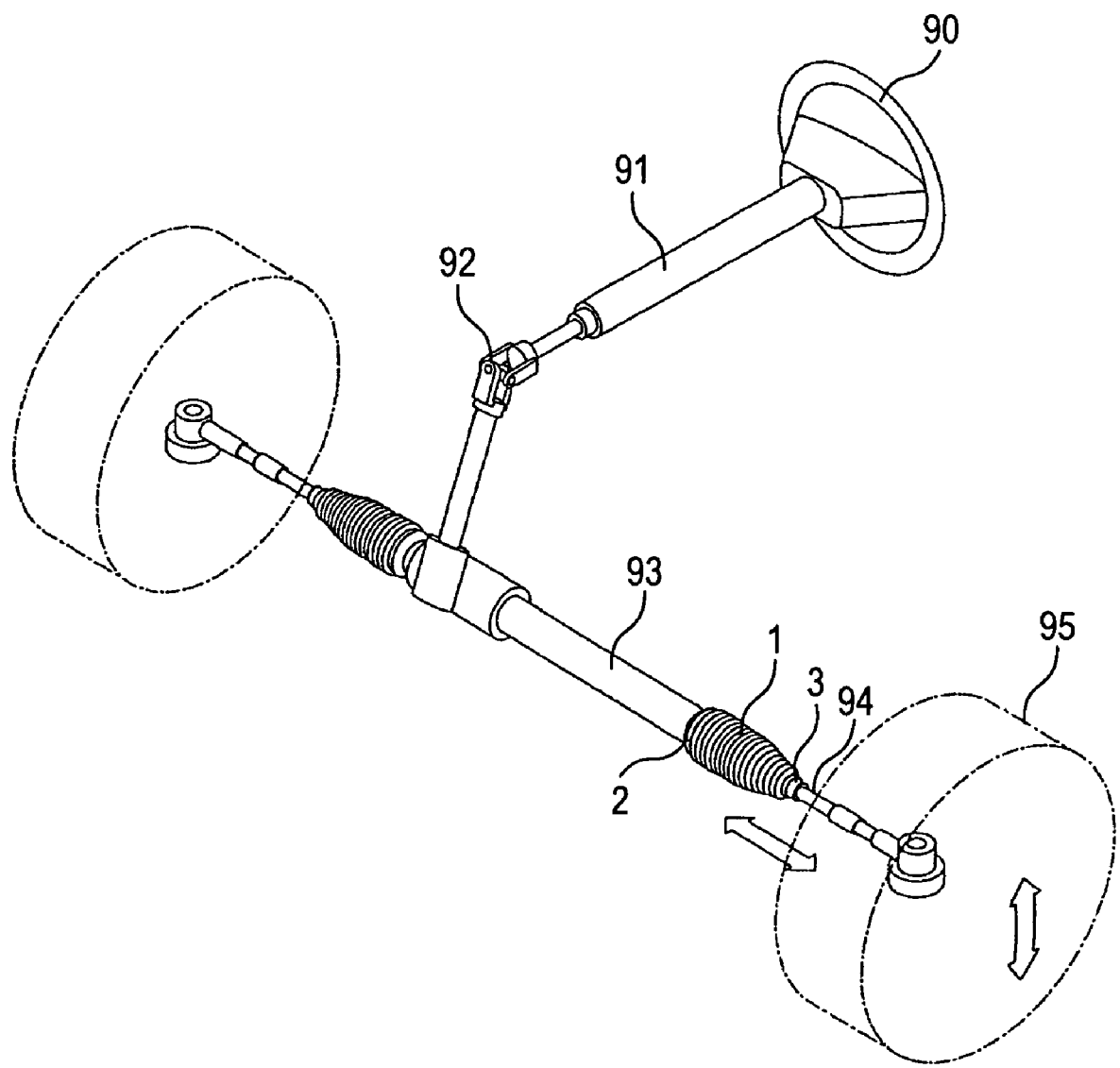
FIG. 1 is a view of attaching a boot according to an embodiment of the invention.

First, an explanation will be given of a position of attaching a boot according to the embodiment. FIG. 1 shows a view of attaching a boot according to the embodiment. As shown by the drawing, a steering wheel 90 is connected to a steering column 91. The steering column 91 is connected to a pinion (not illustrated) included in a steering gear box 93 via a universal joint 92. The pinion is brought in mesh with a rack (not illustrated) similarly included in the steering gear box 93. An end of the rack and a tie rod 94 are connected via a ball joint (not illustrated). The ball joint is covered by a boot 1.

When a driver turns the steering wheel 90, a turning force is transmitted to the pinion via the steering column 91 and the universal joint 92. The pinion is brought in mesh with the rack. Therefore, by rotationally moving the pinion, the rack is reciprocally moved in a vehicle width direction. Further, the rack is extracted and retracted from and to an end of the steering gear box 93. The reciprocal movement of the rack is transmitted to a front wheel 95 (indicated by one-dotted chain lines in the drawing). In this way, a steering angle of the front wheel 95 is adjusted.

Here, a large diameter attachment portion 2 of the boot 1 is fixedly attached to the unmovable end of the steering gear box. Meanwhile, a small diameter attachment portion 3 of the boot 1 is fixedly attached to the reciprocated tie rod 94. Further, as described above, the end of the rack and the tie rod 94 are connected via the ball joint. Therefore, the boot 1 is bent in accordance with pivotal movement of the tie rod 94. Further, the steering gear box 93 is included in a counter side larger diameter member of the invention. Further, the tie rod 94 is included in a small diameter mating member of the invention.

Figure 2:
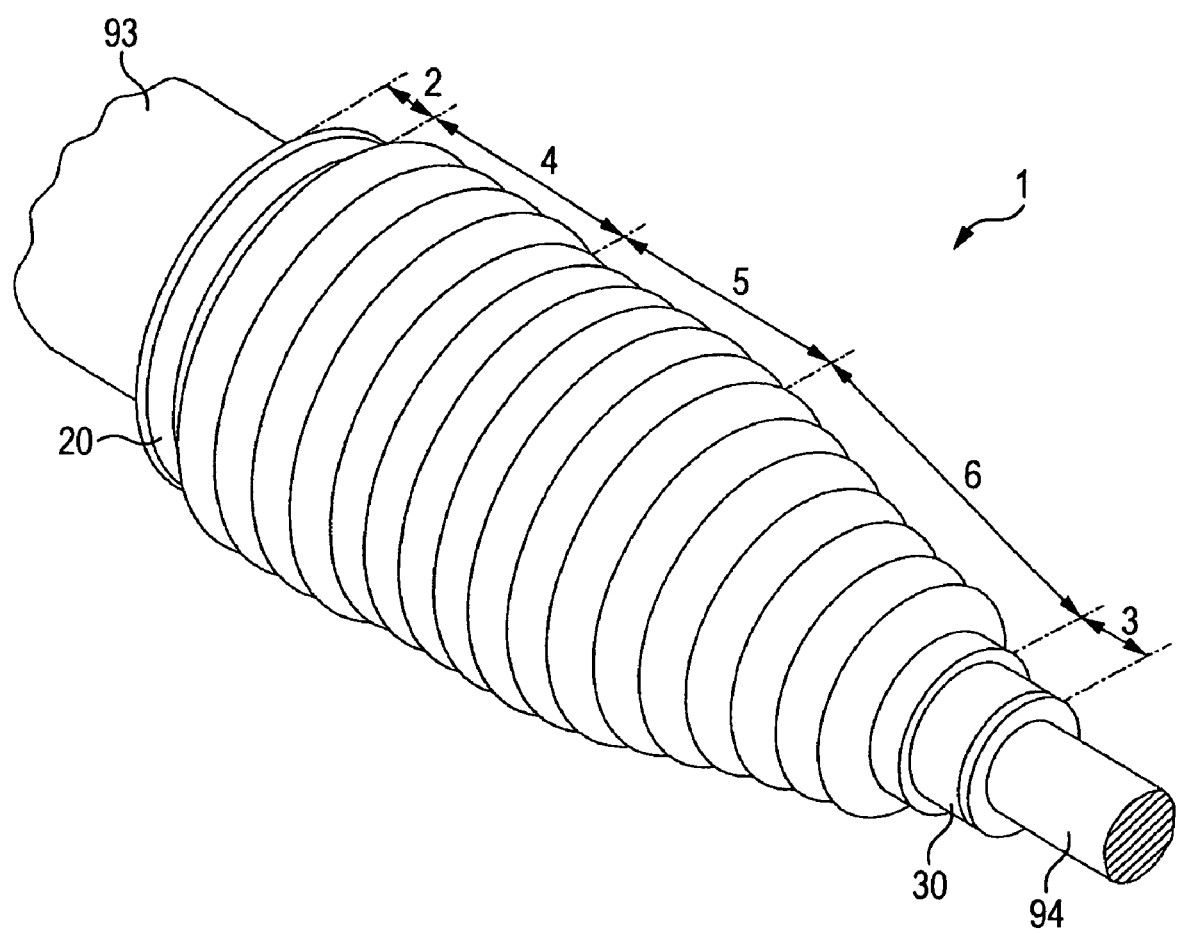
FIG. 2 is a perspective view of the boot.
Figure 3:
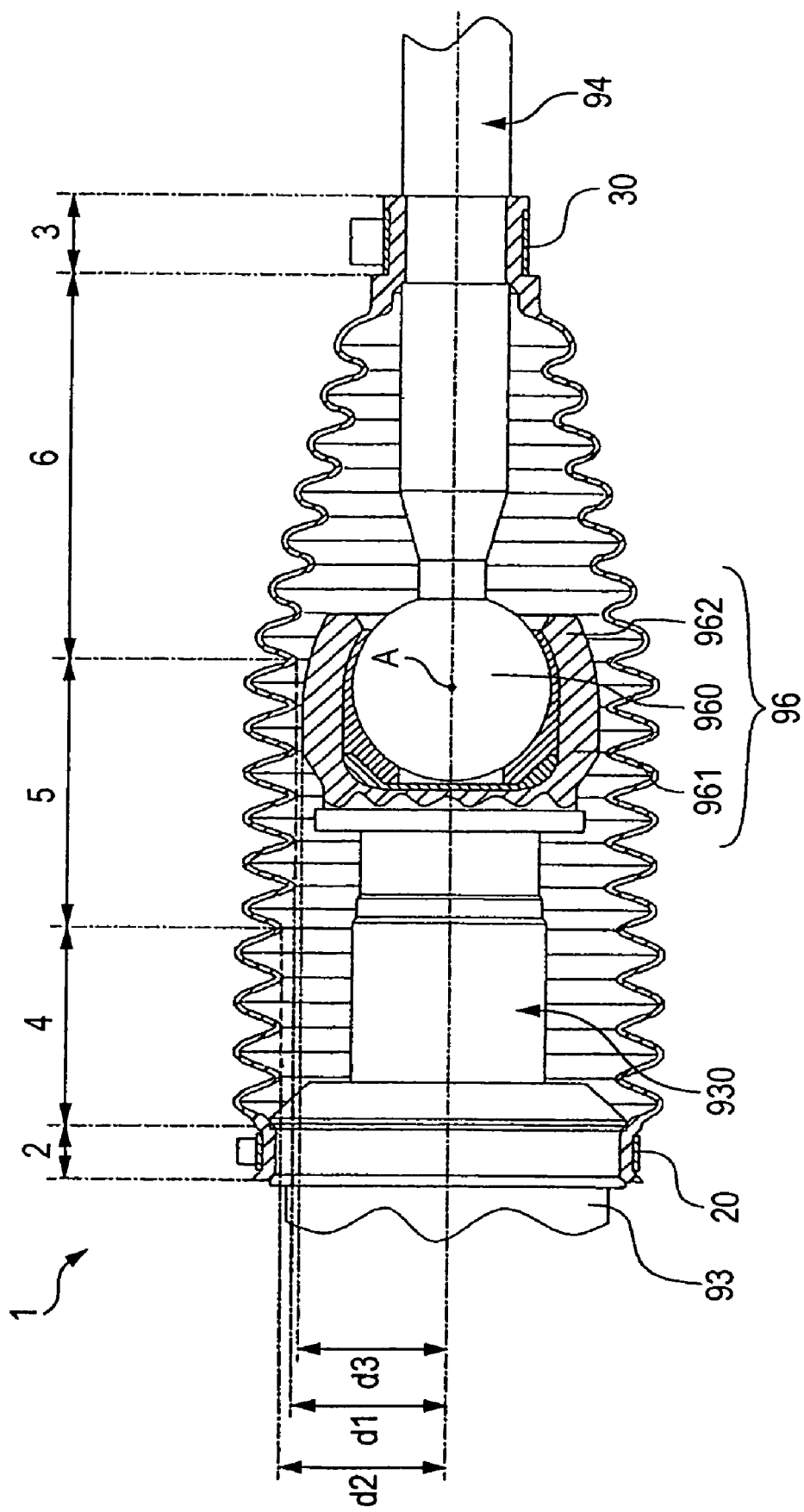
FIG. 3 is a sectional view in an axial direction of the boot.
Figure 4:
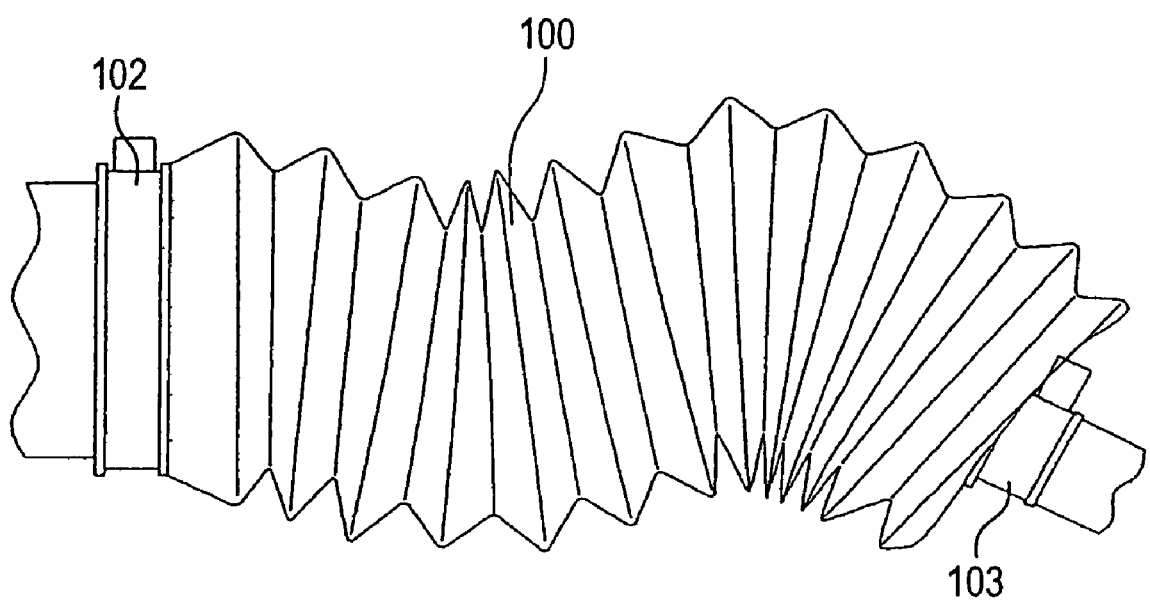
FIG. 4 is a side view in an axial direction of a steering boot of a background art.

Next, an explanation will be given of a constitution of the boot according to the embodiment. FIG. 2 shows a perspective view of the boot according to the embodiment. FIG. 3 shows a sectional view in an axial direction of the boot. As shown by the drawings, the boot 1 includes the large diameter attachment portion 2 and the small diameter attachment portion 3, mentioned above, a first bellows portion 4, a second bellows portion 5 and a taper bellows portion 6. The boot 1 is made of a resin and is fabricated integrally by blow molding.

The large diameter attachment portion 2 shows a ring-like shape. A clamp 20 is mounted to surround the large diameter attachment portion 2. The large diameter attachment portion 2 is fastened to fix to an outer peripheral face of the end of the steering gear box 93 by the clamp 20.

The first bellows portion 4 shows a shape of a cylindrical bellows continuous to the large diameter attachment portion 2. Inner peripheral diameters of ridges of four bellows constituting the first bellows portion 4 substantially coincide with each other. Similarly, also inner peripheral diameters of bottoms of the four bellows substantially coincide with each other. The bottoms of the four bellows in the first bellows portion 4 are illustrated at line d2. A portion of the rack 930 is coaxially contained to the inner peripheral side of the first bellows portion 4.

The second bellows portion 5 shows a shape of a cylindrical bellows continuous to the first bellows portion 4. Inner peripheral diameter ridges of the six bellows constituting the second bellows portion 5 substantially coincide with each other. Similarly, inner peripheral diameters of the bottoms of the six bellows substantially coincide with each other. The bottoms of the six bellows in the second bellows portion 5 are illustrated at line d1. An end portion of the rack 930 and a ball receiving member 961 fixedly attached to the rack 930 are coaxially contained on the inner peripheral side of the second bellows portion 5. Further, a ball member 960 is rollably contained on an inner peripheral side of a recessed portion of the ball receiving member 961. A ball joint 96 is constituted by the ball receiving member 961 and the ball member 960. A spherical center A of the ball member 960 is contained on the inner peripheral side of the second bellows portion 5. The spherical center A is included in a pivotal center of the invention.

Here, a radius d2 of a bottom inner peripheral diameter of the first bellows portion 4 is set to a radius d1 of a bottom inner peripheral diameter of the second bellows portion 5 multiplied by 1.09. The ridge inner peripheral diameter of the first bellows portion 4 is set to be larger than the ridge inner peripheral diameter of the second bellows portion 5. Further, the radius d1 of the bottom inner peripheral diameter of the second bellows portion 5 is set to a radius d3 of an outer peripheral diameter of the ball receiving member 961 multiplied by 1.15.

The taper bellows portion 6 shows a shape of a taper cylindrical bellows which is continuous to the second bellows portion 5 and a diameter of which is contracted toward the small diameter attachment portion 3, mentioned later. An end portion 962 of the ball receiving member 961 is contained on an inner peripheral side of the taper bellows portion 6. Further, a portion of the tie rod 94 fixedly attached to the ball member 960 is coaxially contained therein.

The small diameter attachment portion 3 shows a ring-like shape. The small diameter attachment portion 3 is continuous to an end portion of a small diameter side of the taper bellows portion 6. A clamp 30 is mounted to surround the small diameter attachment portion 3. The small diameter attachment portion 3 is fastened to fix to an outer peripheral face of the tie rod 94 by the clamp 30.

Next, an explanation will be given of movement of the boot according to the embodiment. When an environmental temperature at a vicinity of the boot 1 rises, air hermetically sealed at inside of the boot 1 is expanded. Therefore, the boot 1 is applied with a stress in a diameter enlarging direction. As described above, the radius d2 of the bottom inner peripheral diameter of the first bellows portion 4 is set to the radius d1 of the bottom inner peripheral diameter of the second bellows portion 5 multiplied by 1.09. Therefore, a rigidity in a radial direction of the first bellows portion 4 is higher than a rigidity in a radial direction of the second bellows portion 5. Therefore, the second bellows portion 5 is deformed further predominantly by the stress in the diameter enlarging direction. Here, as described above, the radius d1 of the bottom inner peripheral diameter of the second bellows portion 5 is set to the radius d3 of the outer peripheral diameter d3 of the ball receiving member 961 multiplied by 1.15. That is, the second bellows portion 5 is proximate to the ball receiving member 961. Therefore, the second bellows portion 5 is brought into contact with the ball receiving member 961 soon after starting to deform. Therefore, deformation of the second bellows portion 5 is restricted. The stress in the diameter enlarging direction is naturally applied also to the taper bellows portion 6. By the stress, also the taper bellows portion 6 is deformed. However, an end portion on a large diameter side of the taper bellows portion 6 is proximate to the end portion 962 of the ball receiving member 961. Therefore, the taper bellows portion 6 is brought into contact with the end portion 962 of the ball receiving member 961 soon after starting to deform. Therefore, deformation of the taper bellows portion 5 is restricted.

Next, an effect of the boot of the embodiment will be explained. According to the boot 1 of the embodiment, meandering can be restrained by setting the rigidity in a radial direction of the second bellows portion 5 to be lower than that of the first bellows portion 4 by comparatively simple means of setting a difference between the diameters of the first bellows portion 4 and the second bellows portion 5. Therefore, a number of steps of working a die is small and cost is low. Further, according to the boot 1 of the embodiment, the first bellows portion 4 is difficult to deform and therefore, the first bellows portion 4 is difficult to be brought into sliding contact with the clamp 20.

Further, according to the boot 1 of the embodiment, the radius d2 of the bottom inner peripheral diameter of the first bellows portion 4 is set to the radius d1 of the bottom inner peripheral diameter of the second bellows portion 5 multiplied by 1.09. Therefore, a pertinent difference can be provided between the diameter direction rigidities of the first bellows portion 4 and the second bellows portion 5. Further, by setting elongating and contracting direction rigidities of the first bellows portion 4 and the second bellows portion 5 to be equivalent, not only the second bellows portion 5 but also the first bellows portion 4 can be provided with a function of being elongated and contracted and bent inherent to the bellows.

Further, according to the boot 1 of the embodiment, the spherical center of A of the ball member 960 is arranged on the inner peripheral side of the second bellows portion 5. In addition thereto, the radius d1 of the bottom inner peripheral diameter of the second bellow portion 5 is set to the radius d3 of the outer peripheral diameter of the ball receiving member 961 multiplied by 1.15. Therefore, the boot 1 can easily be mounted to the ball joint 96. Further, there is not a concern of excessively restricting pivotal movement of the ball joint 96 and the tie rod 94 by interference with the second bellows portion 5. Further, an amount of deforming the second bellows portion 5 to be brought into contact with the ball receiving member 961 is small and therefore, meandering of the second bellows portion 5 can sufficiently be restrained.

Further, according to the boot 1 of the embodiment, the spherical center of A of the ball member 960 is arranged on the inner peripheral side of the second bellows portion 5. In addition thereto, the radius d1 of the bottom inner peripheral diameter of the second bellow portion 5 is set to the radius d3 of the outer peripheral diameter of the ball receiving member 961 multiplied by 1.15. Therefore, the boot 1 can easily be mounted to the ball joint 96. Further, there is not a concern of excessively restricting pivotal movement of the ball joint 96 and the tie rod 94 by interference with the second bellows portion 5. Further, an amount of deforming the second bellows portion 5 to be brought into contact with the ball receiving member 961 is small and therefore, meandering of the second bellows portion 5 can sufficiently be restrained.

As described above, an explanation has been given of the embodiment of the boot 1 of the invention. However, an embodiment is not particularly limited to the above-described embodiment. The invention can be embodied in various modified modes or improved modes which can be carried out by the skilled person.

For example, in the above-described embodiment, the radius d2 bottom inner peripheral diameter of the first bellows portion 4 is set to the radius d1 of the bottom inner peripheral diameter of the second bellows portion 5 multiplied by 1.09. In addition thereto, the radius d1 of the bottom inner peripheral diameter of the second bellows portion 5 is set to the radius d3 of the outer peripheral diameter of the ball receiving member 961 multiplied by 1.15. However, the multiplication factors are not particularly limited to the above-described set values. Further, according to the above-described embodiment, the ridge inner peripheral diameter and the bottom inner peripheral diameter of the second bellows portion 5 are respectively set to be smaller than the ridge inner peripheral diameter and the bottom inner peripheral diameter of the first bellows portion. However only either one of the ridge inner peripheral diameter and the bottom inner peripheral diameter may be set to be smaller. Further, the bottom inner peripheral diameter may be set to be smaller and the ridge inner peripheral diameter may be set to be larger.

What is claimed is:

1. A boot for covering a ball joint interposed between a large-diameter mating member and a small-diameter mating member comprising:

a large diameter attachment portion fixed to the large diameter mating member;
a first bellows portion;
a second bellows portion;
a taper bellows portion; and
a small diameter attachment portion fixed to the small diameter mating member;
wherein:
the first bellows portion begins after and is continuous from the large diameter attachment portion to the second bellows portion;
the second bellows portion begins after and is continuous from the first bellows portion to the taper bellows portion;
the taper bellows portion begins after and is continuous from the second bellows portion to the small diameter attachment portion, and
the small diameter attachment portion begins after and is continuous from the taper bellows portion to the small diameter mating member,
wherein the first bellows portion has a plurality of ridges and a plurality of bottoms, the bottoms of the first bellows portion having a first single inner peripheral diameter,
wherein the second bellows portion has a plurality of ridges and a plurality of bottoms, the bottoms of the second bellows portions having a second single inner peripheral diameter,
wherein the second single inner peripheral diameter is smaller than the first single inner peripheral diameter so that a rigidity in a radial direction of the second bellows portion is lower than a rigidity in a radial direction of the first bellows portion,
wherein the first single inner peripheral diameter is not larger than 1.3 times of the second single inner peripheral diameter,
wherein a pivotal center of the ball joint is to be contained on an inner peripheral side of the second bellows portion,
wherein the second single inner peripheral diameter is equal to or slightly larger than an outer peripheral diameter of the ball joint which is to be contained,
wherein the second single inner peripheral diameter of the second bellows portion is the outer peripheral diameter of the ball joint which is to be contained multiplied by a multiplication factor equal to or larger than 1.0 and less than 1.25.

2. The boot according to claim 1, wherein an end portion of the ball joint is to be contained in the taper bellows portion.

3. The boot according to claim 1, wherein the first single inner peripheral diameter is 1.09 times the second single inner peripheral diameter.

4. The boot according to claim 1, wherein the second single inner peripheral diameter of the second bellow portion is the outer peripheral diameter of the ball joint which is to be contained multiplied by a multiplication factor equal to 1.15.

5. The boot according to claim 1, wherein the plurality of ridges of the first bellows portion have a single inner peripheral diameter.

6. The boot according to claim 1, wherein the plurality of ridges of the second bellows portion have a single inner peripheral diameter.

7. The boot according to claim 1, wherein the first bellows portion has four ridges and four bottoms.

8. The boot according to claim 7, wherein the second bellows portion has six ridges and six bottoms.

9. The boot according to claim 1, wherein the second bellows portion has six ridges and six bottoms.

* * * * *